United States Patent Office 3,523,058
Patented Aug. 4, 1970

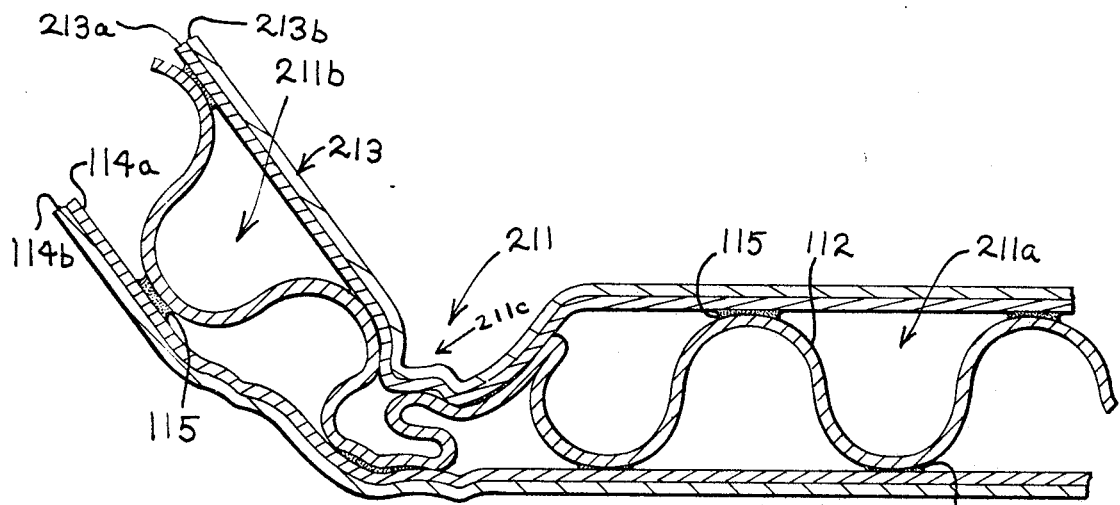
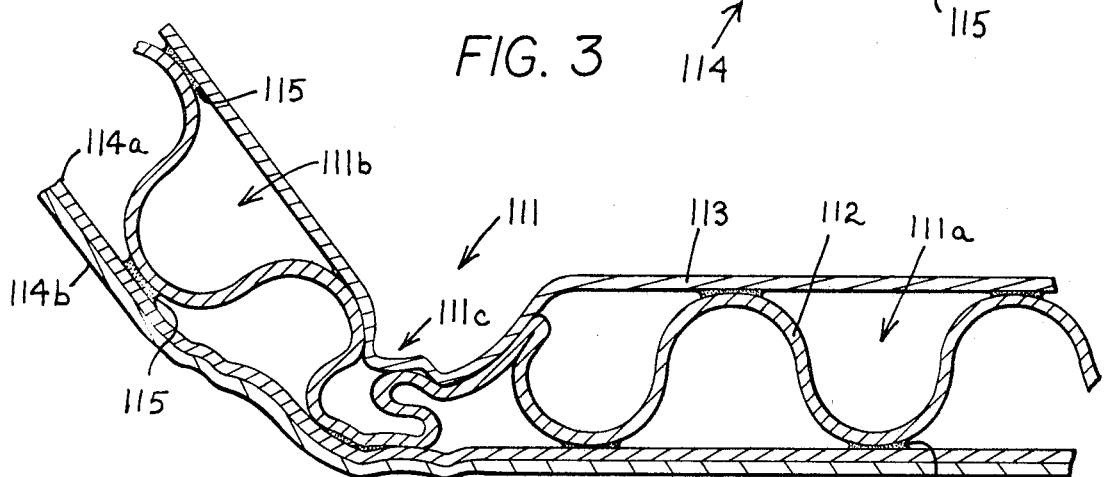
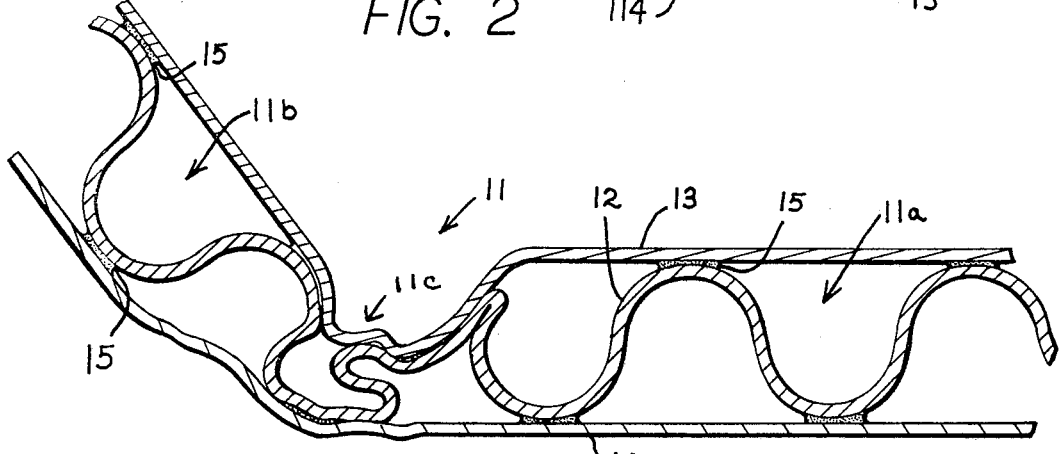

3,523,058
FABRICATABLE STIFF-WHEN-WET CORRUGATED PAPERBOARD
Philip E. Shick, Toledo, Ohio, assignor to Owens-Illinois, Inc., a corporation of Ohio
Continuation-in-part of application Ser. No. 421,295, Dec. 28, 1964. This application Apr. 5, 1968, Ser. No. 733,199
Int. Cl. B32b 3/28, 3/30
U.S. Cl. 161—133
9 Claims

ABSTRACT OF THE DISCLOSURE

This application discloses a type of corrugated paperboard having a convoluted paper medium ply, with a relatively high concentration of a rigidifying resin, and a pair of spaced-apart facing paper liner sheets bonded to opposite sides of the medium ply by means of a water-insoluble adhesive, with one of the liner sheets comprising an outwardly-facing sheet of substantially greater flexibility than the medium sheet by incorporating a rigidifying resin concentration in the range from zero to an amount substantially less than the content of the medium sheet.

RELATED APPLICATION

This application is a continuation-in-part of co-pending application Ser. No. 421,295, filed on Dec. 28, 1964, now abandoned.

SUMMARY OF THE INVENTION

This invention relates to a type of corrugated paperboard possessing unusual stiffness even when wet, and sufficient fabricatability to permit fabrication thereof, by means of scoring and the like, into "blanks" from which cartons and other structures may be constructed. More particularly, the invention relates to corrugated paperboard which possesses unusual stiffness by virtue of the introduction of a resinous material in a substantial concentration (hereinafter, "rigidifying resin content") into the ply of paper from which the convoluted medium sheet is formed, and which possesses fabricatability by maintaining the resin content of the outer ply of paper utilized in the corrugated paperboard at a concentration in the range of zero to substantially less than the concentration of the medium sheet (hereinafter, "reduced resin content"). In a particular embodiment, the outer liner sheet of the corrugated paperboard comprises an inner ply of a high "rigidifying resin content" and an outer ply of a "reduced resin content" laminated thereto. In another embodiment, the outer liner sheet comprises a single ply of paper of a "reduced resin content." Corrugated paperboard according to either embodiment will also comprise an inner liner sheet which may comprise a single ply of paper of a high "rigidifying resin content"; a single ply of paper of a "reduced resin content," or, for optimum performance characteristics in demanding service, an inner ply of paper of a high "rigidifying resin content" with an outer ply of paper of a "reduced resin content" laminated thereto.

In the production of corrugated paperboard, it is well known that the notoriously poor stiffness-when-wet characteristic of ordinary corrugated paperboard may be increased manyfold by the introduction of certain resinous materials in relatively high concentrations into the sheets of paper from which the corrugated paperboard is formed, thereby giving rise to possible applications of corrugated paperboard in the construction of cartons or other structures destined for use in an environment of high humidity, or even when exposed to contact with water. The resinous material may comprise one or more of a wide variety of hard resins including thermosetting resins, such as phenol formaldehyde resins and epoxy resins, certain thermoplastic materials such as polystyrene and ethyl cellulose, and methacrylate and urethane resins. Depending on the nature of the resinous material, the severity of service required of the finished board, and various factors related to manufacturing economy, the resinous material may be introduced into pertinent plies of paper comprising the finished corrugated paperboard in a number of ways. For example, the resin may be introduced into the pulp from which the paper is formed in the manner described in an abandoned application of N. C. S. Chari and G. S. Scarvelis, Ser. No. 410,662, now abandoned assigned to the assignee of this application. Alternatively, the pertinent individual sheets of paper may be impregnated with an uncured resinous material, a solution or a hot melt as by roller coating, prior to their assembly into corrugated paperboard. Also, in cases where the outer liner sheet of the corrugated paperboard is intended to comprise a multi-ply sheet, a sheet of corrugated paperboard, prior to the addition thereto of the outer ply, may be impregnated with a resin by immersion or roller coating in the manner described in co-pending application of C. W. Wilkins, Ser. No. 410,508, now Pat. No. 3,402,068, also assigned to the assignee of this application.

Characteristic of many of the known resins of significant commercial value for treating corrugated paperboard in concentrations sufficient to impart thereto levels of wet-stiffness required for severe moisture applications, is the tendency of such methods to impart to the corrugated paperboard a degree of brittleness that makes such board difficult to fabricate, as by scoring and the like, into blanks from which cartons and other articles of utility may be constructed. This problem is of particular severity in the case of scoring such corrugated board where there is a tendency to outright fracture the corrugated board. Thus, the use of corrugated paperboard with a resin content of the order of magnitude that would bring the board to, or close to, its optimum attainable wet-stiffness (usually involving a resin content of at least 8% and often as high as 12 or even 15%, depending on the resin employed, of the weight of the finished board) in applications where a degree of wet-stiffness approaching the optimum is required, has not materialized on a large scale to date.

It has now been found, however, that the fabricatability of corrugated paperboard of high wet-stiffness by virtue of the introduction of resin into at least the medium sheet in relatively high concentrations may be greatly enhanced by providing such corrugated paperboard with an outer liner comprising at least a single outwardly-facing ply of paper having a resin content of the order of magnitude of from zero to substantially less than the resin content of the medium sheet. By virtue of its "reduced resin content" such a ply retains all, or most of, the flexibility characteristic of paper which is lost by the introduction thereinto of resin and, therefore, serves, after scoring, as an easily foldable hinge about which juxtaposed panels of such corrugated paperboard may be folded with respect to one another into different planes. While the inner liner or the outer ply of a multiply inner lier, may also be of such "reduced resin content," it is critical that the outer liner, in the case of a single-ply outer liner, or the outer ply of a multi-ply outer liner, be of such a "reduced resin content" because such a ply is subjected to greater tensile stresses by scoring than any other of the plies constituting the corrugated paperboard. Additionally, the use of such an outer ply of a reduced resin content insures that any cracks which may occur in the corrugated board will not be on the exterior of the carton, or other item to be constructed therefrom, where such cracks would be unsightly and would be subject to aggravation and possible separation by contact with other cartons or other objects which such carton or item might contact during its use.

Accordingly, it is an object of the present invention to provide a sheet of corrugated paperboard characterized by having sufficient wet-stiffness to permit its use in the construction of cartons and other articles which may be subjected for prolonged periods to an environment of high humidity and/or standing water during use, such corrugated paperboard possessing, nonetheless, sufficient fabricatability to permit fabrication thereof, by means of scoring and the like, into "blanks" from which such cartons and structures may be constructed.

Additionally, it is an object of the present invention to provide a sheet of corrugated paperboard having at least a pair of panels disposed at an angle with respect to one another in juxtaposition along a score line wherein the convoluted medium sheet of such corrugated paperboard contains a high concentration of a resin of a type which imparts wet-stiffness thereto and wherein at least one ply of paper of such corrugated paperboard is of a high degree of flexibility, such sheet being useful in the construction of cartons and other items of utility adapted to use in severe environmental conditions.

For a further understanding of the invention, attention is directed to the following portion of the specification, the drawings, and the appended claims.

In the drawing:

FIG. 1 is a fragmentary sectional view of an embodiment of a portion of a sheet of corrugated paperboard in accordance with the present invention which has been vertically scored to define a pair of panels extending at an angle with respect to one another;

FIG. 2 is a view, similar to FIG. 1, of an alternative embodiment of a portion of a sheet of corrugated paperboard constructed in accordance with the present invention; and FIG. 3 is a view, similar to FIGS. 1 and 2, of yet another embodiment of a sheet of corrugated paperboard constructed in accordance with the present invention.

Turning now to FIG. 1, there is illustrated a fragmentary view of a sectional of corrugated paperboard, designated by numeral 11, which is scored along a vertically-extending line to define first and second panel portions, designated generally by numerals 11a and 11b, which are foldable with respect to one another about a crushed hinge portion 11c which extends in a vertical pattern along the score line of sheet 11. As is shown in FIG. 1, portions 11a and 11b are shown at a point in time between the time when the panel portions are originally coplanar with one another and the final point in time when they are at their final desired position with respect to one another, usually perpendicular to one another. Sheet 11 is constructed of at least three plies or sheets of paper comprising an internal or "medium" sheet 12 which is of corrugated or convoluted configuration and oppositely disposed liner sheets 13 and 14, which are secured to medium sheet 12 by means of lines of adhesive 15, preferably of a type which is insoluble in water for reasons which will be explained later, lines of glue 15 being located at the high points of the corrugations or convolutions of medium sheet 12. An example of a satisfactory water-insoluble adhesive is a resorcinol-treated starch adhesive marketed by the Staley Manufacturing Company of Decatur, Ill., under the designation of "Staybind 5030."

For purposes of increasing the stiffness of sheet 11 when wet, in order to render sheet 11 fit for the construction of cartons and other items which are expected to encounter an environment of high humidity and/or standing water in service, medium sheet 12 has introduced therein a relatively high concentration of rigidifying resin. The resin content of medium sheet 12 can be from about 8 to about 50 percent by weight. A more preferred range for the resin content is from about 12 to about 15 percent, with a most preferred resin content being 15 percent. Resins as described below can be used for the treatment of medium sheet 12. All percentages referenced herein are by weight.

Suitable resinous materials for use in accordance with this invention are, for example, thermosetting phenol formaldehyde resins or epoxy resins, of known capability for imparting stiff-when-wet properties to paper. Further examples of resins which are adapted for use in this invention are rigid types of melamine and phenol formaldehyde resins, vinyl resins, acrylic resins, polyester resins and epoxy resins. The most preferred resins for use in accordance with this invention are phenol formaldehyde resins and melamine formaldehyde resins.

In accordance with the present invention, such resinous material is introduced into medium sheet 12 prior to the point in time when medium sheet 12 is joined to that one of the liner sheets, shown as sheet 14, which will serve as the outer liner of corrugated paperboard 11 in service, i.e., that sheet which will be disposed exteriorly when panels formed in corrugated paperboard 11 by scoring are folded with respect to one another. The introduction of the resinous material into medium ply 12 may be accomplished either before or after medium ply 12 is joined to inner ply 13 depending mainly on the desirability of introducing resinous material into inner ply 13 from the standpoint of the resultant properties required of corrugated sheet 11 in the particular application envisioned. When it is desirable to have a comparable concentration of resinous material in inner ply 13 to that required of medium ply 12, the step of introducing the resinous material may be conveniently accomplished by impregnation, either by dipping or by roller coating, at a point in time subsequent to the joining of inner ply 13 to medium ply 12. At such point in time, the combination of a medium ply 12 and an inner ply 13 is commonly referred to as "single-face" corrugated paperboard and such occurs at a recognized intermediate processing step practiced by all widely commercially used corrugating processes. Thus, the step of resin-impregnating "single-face" corrugated paperboard is readily compatible with conventional corrugating processes.

The resin content of inner ply 13 can be from about 8 to about 50 percent, with a more preferred range being from about 12 to about 15 percent. A most preferred resin content for inner ply 13 is 15 percent.

Outer liner ply 14 of corrugated sheet 11 is required to have all, or most of, the flexibility characteristics of untreated paper and therefore ply 14 can be untreated or it can have a resin content substantially less than that of medium ply 12 because the introduction of such resin detracts from the original flexibility of a sheet of paper. The reason why it is so important that liner ply 14 retain much of its original flexibility as compared to medium ply 12 and liner ply 13 is that liner ply 14 is subjected to maximum tensile forces which are the most likely to cause cracking and/or fracture of an inflexible or brittle sheet of paper and because the outwardly-facing exposure of liner ply 14 would make any cracks that might develop therein particularly objectionable because of their unsightliness and because of the danger that such cracks could be aggravated by impact or contact with extraneous objects. The resin content of ply 14 can be from about 0 to 3 percent. A more preferred range for the resin content is from about 0.5 to about 1 percent, with a most preferred resin content being 1 percent. Resins as described above can be used for the treatment of ply 14; however, the more flexible grades or modifications of these resins are preferred.

Turning now to the embodiment of the invention illustrated in FIG. 2, there is shown a section of a sheet of corrugated paperboard 111 which has been scored along a vertically-extending line to define a pair of side-by-side panel portions 111a and 111b foldably joined to one another along a crushed hinge portion 111c which is disposed along the vertically-extending score line. Sheet 111 is constructed of at least three sheets of paper comprising an internal or "medium" sheet which is of corrugated or convoluted configuration and oppositely disposed liner sheets 113 and 114 which are secured to medium sheet 112 by means of lines of water-insoluble adhesive 115 located at the apices of the corrugations or convolutions of medium sheet 112. In such a construction, liner sheet 114 is of a multiple-ply construction comprising an inner liner ply 114a which is directly secured to medium sheet 112 and an outer ply 114b which is laminated, or otherwise permanently secured, to inner ply 114a. Sheet 111 further comprises a single-ply inner liner sheet 113.

For increased wet-stiffness, medium sheet 112, inner liner ply 114a of outer liner 114, and preferably also inner ply 113, have introduced therein a relatively high concentration of a resinous material of known capability in imparting stiff-when-wet properties to paper. The resin content of plies 113 and 114a can be from about 8 to about 50 percent. A more preferred range for the resin content is from about 12 to about 15 percent, with a most preferred resin content being 15 percent. Resins as described above can be used for the treatment of plies 113 and 114a. When it is desirable that inner liner 113 of such a construction should incorporate a comparably high resin content as medium sheet 112 and inner ply 114a of outer liner 114, which will normally be the case, such resin introduction may be conveniently accomplished by the impregnation of more or less conventional "double-face" corrugated paperboard, prior to the lamination thereto of outer ply 114b of outer liner 114. Thereafter, outer reply 114b of liner 114 is secured to inner ply 114a, as by means of a latex-type adhesive, and it is of a resin content substantially less than that of medium ply 112 and inner ply 114a of liner 114, for example, of a substantially zero resin content.

According to such a construction, sheet 111 of corrugated paperboard comprises a greater number of resin-containing sheets that does sheet 11 of FIG. 1, thereby rendering it fit for service in more severe applications, and, nonetheless, still incorporates a flexible outer sheet 114b which acts as a flexible hinge about which panels 111a and 111b, formed in sheet 111 by scoring, may be folded with respect to one another.

In the embodiment of the invention illustrated in FIG. 3, there is shown a section of a sheet of corrugated paperboard 211 which has been scored along a vertically-extending line to define a pair of side-by-side panel portions 211a and 211b foldably joined to one another along a crushed hinge portion 211c which is disposed along the vertically-extending score line. Sheet 211 comprises a medium sheet and an outer liner which are identical to the medium sheet and outer liner of the embodiment of FIG. 2 which are, therefore, also designated by numerals 112 and 114. Sheet of corrugated paperboard 211 differs from sheet 111 in that it comprises an inner liner sheet 213 of multiple-ply construction comprising an inner ply 213a which, with outer liner 114, is adhered to medium sheet 112 by means of water-insoluble adhesive 115.

In such a construction, inner ply 213a of inner liner 213, as well as medium sheet 112 and inner ply 114a of outer liner 114, are of a relatively high resin content which may be accomplished, for example, by impregnating more or less conventional "double-face" corrugated paperboard prior to the lamination thereof of exteriorly-disposed plies 114b and 213b. The advantage of the embodiment illustrated in FIG. 3 over the embodiments heretofore described is that, for the type of corrugated paperboard commonly referred to as single-wall board, it incorporates the maximum number of individual sheets of high resin content that can be obtained, namely three (3), while, at the same time, comprising externally-disposed plies of flexible low resin content paper to safeguard against any externally-oriented cracks on either the inner or outer surfaces of the corrugated paperboard and of cartons and other objects constructed therefrom. The resin content of ply 114a is as described above while the resin content of ply 213a can be from about 8 to about 50 percent. A more preferred range for the resin content is from about 15 to about 25 percent, with a most preferred resin content being 15 percent. Resins as described above can be used for the treatment of ply 213a. Ply 213b is usually kept free of resin.

The invention will now be outlined in more detail by the recitation of the following examples constituting various treatments administered to samples of corrugated paperboard, together with a compilation of the results and properties of such corrugated paperboard. These examples are being presented for the sole purpose of showing the desirable results that can be obtained by the practice of the present invention and are not intended to serve in any way as a limitation on the inventive concept described in this patent application. All percentages given are by weight.

EXAMPLE 1

A sheet of corrugated paperboard similar to that illustrated in FIG. 1 was formed from a conventional corrugated medium sheet of a weight of 36 pounds per thousand square feet and from a conventional pair of liner sheets of a weight of 42 pounds per thousand square feet, said medium sheet and liner sheets being adhered to one another by means of water-insoluble adhesive. A section of such corrugated paperboard, precut to 12" x 12", and weighing approximately 0.14 pound, was immersed into a dip tank containing a mixture of a phenol-formaldehyde resin and an ammonium chloride catalyst in the amount of one-half percent based on resins solids content, said phenol formaldehyde resin being of the type marketed by Pacific Resins & Chemicals of Newark, Ohio, under the designation "Amres 1430" and nominally comprising a 46% solid resin dispersion. The sample was removed from the solution in the dip tank after a period of approximately five seconds, it was shaken to remove excessive resin which accumulated in the flutes and was then placed in a curing oven where it was maintained at a temperature of 300° F. for approximately five minutes. The weight of resin pickup was approximately 0.04 pound of solids, or 30% based on fiber. A latex-type laminating adhesive, of the type marketed under the designation "Dow 630," was applied to both the exterior faces of the sample by means of a brass draw-down plate and non-resin containing kraft paper liner of the weight of 42 pounds per thousand square feet was attached to each of the adhesive-covered surfaces of the sample, while the adhesive was still wet. The kraft paper plies were maintained in position with respect to the sample by means of paper clips until the adhesive had dried, drying of the adhesive having been accelerated by placing the sample back in the curing oven for approximately ten seconds. The sample with kraft paper plies laminated to both faces thereof was scored both with and across the direction of the flutes, with no score cracking taking place.

EXAMPLE 2

A section of corrugated paperboard was impregnated with approximately 30% of Amres 1430 resin in the same manner as in Example 1, and after curing of the resin, a 42 pound non-resin content liner was laminated to one side of the corrugated board section using Dow 630 adhesive. This was held in place until the adhesive was dried by a further oven treatment for approximately ten seconds. The final sample comprising one kraft paper liner, laminated to the resin-impregnated corrugated board, was scored and folded both in and across the flute direction with some scored cracking noted on the side which did not have a kraft paper ply laminated thereto, and no score cracking on the side to which the kraft liner had been laminated.

EXAMPLE 3

Samples of a sheet of corrugated paperboard of a composition similar to that used for Examples 1 and 2, namely 42–36–42 board, were impregnated with an epoxy resin (of a type marketed by the Shell Chemical Company under the designation Shell Epon 815), catalyzed with diethylenetriamine, one part to twelve, and were laminated while still "tacky" to unimpregnated 42 pound kraft paper liners on both of the exterior faces thereof. The pickup of resin was approximately 0.18 pound of resin per square feet, corresponding to about 130% resin based on fiber for the original corrugated board. The samples were allowed to cure at room temperature overnight. It was found that these samples could be readily folded by crushing the impregnated portion of the board followed by folding at the score produced. It was also found that these samples could be folded by slit scoring, wherein the unimpregnated portion of the liners was utilized as a hinge.

EXAMPLE 4

In addition to standard non-resin content liners, kraft liners of 42 and 26 pounds per thousand square feet fiber weight and 36 pound per thousand square feet semichemical corrugated medium similar to that illustrated in FIG. 1, containing 15% added Amres 1430 resin solids were prepared. The Amres resin was added to the pulp slurry at the so-called wet end of the machine and was precipitated on the fiber by the further addition of 1% alum and sufficient sulfuric acid to give a pH of five. Using a 7% resorcinol adhesive, corrugated board was manufactured on a conventional corrugator utilizing the 15% Amres resin 42 pound liner as a single-face liner and the 15% Amres 1430 36 pound corrugating medium as the medium. The single-face board was combined using 7% resorcinol starch with a conventional non-resin content 42 pound liner board at the double backer of the corrugator. The board off the corrugator was aged for one day for moisture equalization and was run on conventional corrugating converting equipment to produce corrugated containers for produce packaging. Corrugated containers so produced were aged for two weeks or longer in storage to further cure the Amres resin before use in the field. The flaps could be folded on these boxes without score cracking of the non-resin content double-face liner.

EXAMPLE 5

A corrugated board as shown in FIG. 1 was formed using 7% resorcinol adhesive with a 15% Amres 1430 42 pound single-face liner, a 15% Amres 1430 36 pound medium, and a 15% Amres 1430 26 pound double-face liner and, in addition, a conventional non-resin content 42 pound liner was laminated at the double backer on the outside of the 26 pound resin content liner using a water-proof polyvinyl acetate adhesive. The resultant corrugated board was aged for one day for moisture equalization before conversion on a corrugated box-making equipment to boxes intended for produce packaging. These boxes were further aged for two weeks for further air curing of the Amres 1430 resin prior to use. Under the usual conditions of relative humidity experienced in produce packaging, the flaps on these boxes did not crack on the outside of the box, but provided adequate strength and flexibility for packaging use.

It will, of course, be obvious to one skilled in the art that various modifications and changes can be made to the preferred embodiments of the invention described herein without departing from the principles of the invention, and it is not, therefore, the purpose of the foregoing description to limit the patent granted hereon other than as is necessary by the scope of the appended claims.

I claim:
1. Corrugated paperboard comprising, a convoluted paper medium sheet having first and second paper planar liner sheet means secured to opposite sides thereof by a water-insoluble adhesive, wherein:
 (a) said medium sheet incorporates from about 8 to about 50 percent of a rigidifying resin;
 (b) said first liner sheet has substantially the same flexibility as the medium sheet and incorporates a rigidifying resin content in the range from about 8 to about 15 percent;
 (c) said second liner sheet has substantially greater flexibility than the medium sheet and incorporates a rigidifying resin content in the range from about 1 to about 3 percent, all percentages by weight.
2. The corrugated paperboard in accordance with claim 1 wherein the second liner sheet is essentially free of said rigidifying resin.
3. The corrugated paperboard in accordance with claim 1 wherein at least one of said first and second liner sheets is a two-ply adhesively-bound composite which is formed from a sheet of paperboard which is essentially free of said rigidifying resin and a sheet of paperboard which contains from about 8 to about 50 percent of a rigidifying resin.
4. The corrugated paperboard in accordance with claim 1 wherein:
 (a) said medium sheet incorporates about 15 percent of a rigidfying resin;
 (b) said first liner sheet incorporates about 15 percent of a rigidifying resin;
 (c) said second liner sheet incorporates about 1 percent of a rigidifying resin.
5. A carton which is formed from the corrugated paperboard of claim 1 wherein said second liner sheet contains substantially less rigidifying resin than said first liner sheet and said second liner sheet being the outwardly-facing sheet in said carton.
6. The carton of claim 5 wherein said second liner sheet is essentially free of said rigidifying resin.
7. The carton of claim 5 wherein said second liner sheet is a two-ply adhesively-bound composite which is formed from a sheet of paperboard which is essentially free of said rigidifying resin and a sheet of paperboard which contains from about 12 to about 15 percent of a rigidifying resin.
8. The carton of claim 7 wherein the sheet of paperboard which is essentially free of said rigidifying resin is the outwardly-facing sheet in said carton.
9. A carton which is formed from the corrugated paperboard of claim 4 and said second liner sheet is the outwardly-facing sheet in said carton.

References Cited

UNITED STATES PATENTS

| | | | |
|---|---|---|---|
| 1,561,471 | 11/1925 | Kress | 161—137 |
| 2,982,333 | 5/1961 | Little | 161—137 |
| 3,085,731 | 4/1963 | Wilkins | 229—3.1 |

DOUGLAS J. DRUMMOND, Primary Examiner

W. E. HOAG, Assistant Examiner

U.S. Cl. X.R.

229—14, 3.1, 3.5